US010215857B2

(12) United States Patent
Oggier et al.

(10) Patent No.: US 10,215,857 B2
(45) Date of Patent: Feb. 26, 2019

(54) DEPTH SENSOR MODULE AND DEPTH SENSING METHOD

(71) Applicant: ams Sensors Singapore Pte. Ltd., Singapore (SG)

(72) Inventors: Thierry Oggier, Zürich (CH); Mathias Deschler, Fribourg (CH); Stéphane Kaloustian, Zimmerwald (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/532,612

(22) PCT Filed: Nov. 30, 2015

(86) PCT No.: PCT/SG2015/050477
§ 371 (c)(1),
(2) Date: Jun. 2, 2017

(87) PCT Pub. No.: WO2016/089305
PCT Pub. Date: Jun. 9, 2016

(65) Prior Publication Data
US 2017/0343675 A1    Nov. 30, 2017

(30) Foreign Application Priority Data

Dec. 2, 2014    (CH) .................................. 01851/14

(51) Int. Cl.
*G01S 17/48*    (2006.01)
*G01S 17/02*    (2006.01)
(Continued)

(52) U.S. Cl.
CPC ............ *G01S 17/48* (2013.01); *G01S 7/4813* (2013.01); *G01S 7/4815* (2013.01);
(Continued)

(58) Field of Classification Search
CPC .............. G02B 27/0172; G02B 6/0016; G02B 2027/0125; G02B 2027/0178;
(Continued)

(56) References Cited

U.S. PATENT DOCUMENTS

| 5,099,266 A | 3/1992 | Nakajima et al. |
| 5,541,723 A * | 7/1996 | Tanaka ................... G01C 3/085 |
| | | 356/3.01 |

(Continued)

FOREIGN PATENT DOCUMENTS

DE    202008011469    1/2010

OTHER PUBLICATIONS

Australian Patent Office, International Search Report for International Patent Application No. PCT/SG2015/050477 dated Mar. 1, 2016, 3 pages.

*Primary Examiner* — Michael P Stafira
(74) *Attorney, Agent, or Firm* — Fish & Richardson P.C.

(57) ABSTRACT

The invention relates to a depth sensor module and depth sensing method. The depth sensor module and method is adapted to include a light detector part and emitting part with a least two light sources spatially offset in the direction of the triangulation baseline. In some of the embodiments, the pixel field of the image sensor in the light detector part consists of time-of-flight pixels. Depth measurements derived by triangulation can be used to calibrate depth maps generated by the time-of-flight measurements.

18 Claims, 6 Drawing Sheets

(51) Int. Cl.
*G01S 17/42* (2006.01)
*G01S 17/89* (2006.01)
*G01S 7/481* (2006.01)
*G01S 7/491* (2006.01)
*G01S 7/497* (2006.01)
G01S 17/10 (2006.01)
G01S 17/36 (2006.01)

(52) U.S. Cl.
CPC ............ *G01S 7/4816* (2013.01); *G01S 7/497* (2013.01); *G01S 7/4913* (2013.01); *G01S 17/026* (2013.01); *G01S 17/42* (2013.01); *G01S 17/89* (2013.01); G01S 17/10 (2013.01); G01S 17/36 (2013.01)

(58) Field of Classification Search
CPC .............. G02B 27/0081; G02B 6/0076; G02B 2027/0118; G02B 2027/012; G02B 2027/014; G02B 27/1086; G02B 6/0023; G02B 6/0038; G02B 2027/0114
See application file for complete search history.

(56) References Cited

U.S. PATENT DOCUMENTS

| | | |
|---|---|---|
| 6,088,106 A | 7/2000 | Röckseisen |
| 2005/0285024 A1 | 12/2005 | Eubelen |
| 2007/0229798 A1 | 10/2007 | Cattin et al. |
| 2013/0002823 A1 | 1/2013 | Lim et al. |

\* cited by examiner

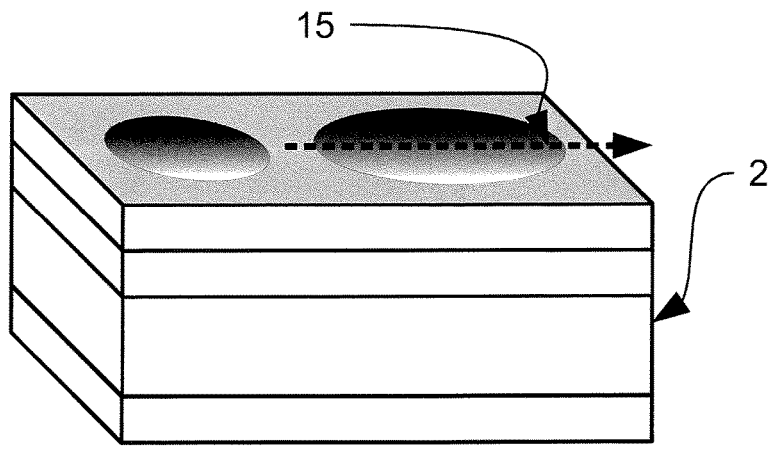
Fig. 1a
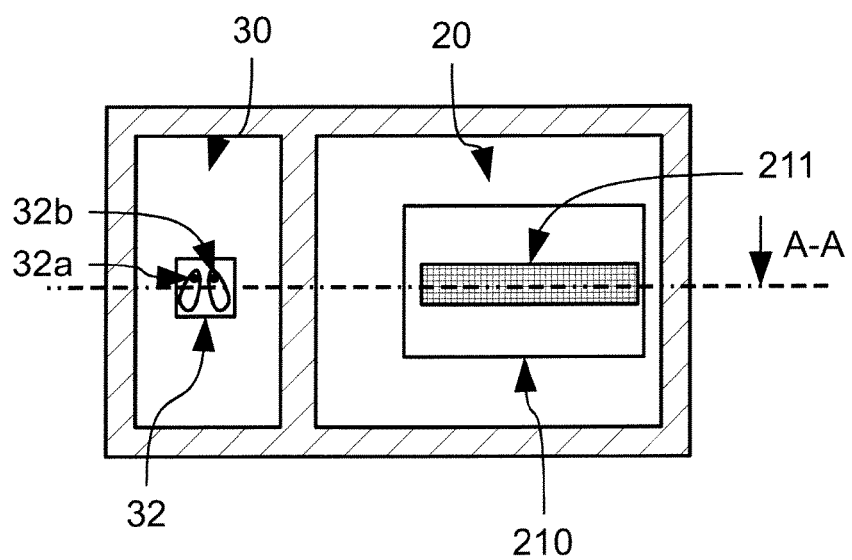
Fig. 1b (B-B)
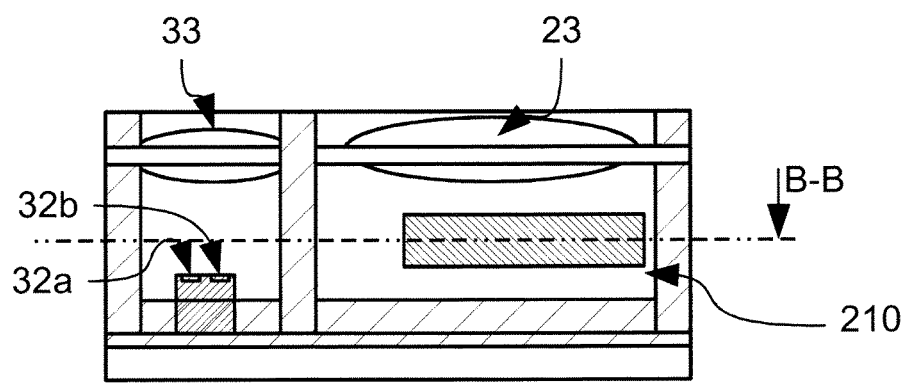
Fig. 1c (A-A)

(B-B)

(A-A)

DEPTH SENSOR MODULE AND DEPTH SENSING METHOD

The present invention relates to an optical depth sensor module and depth sensing system. In a specific aspect, the optical depth sensor module can be used as proximity sensor with enhanced functionalities.

Optical proximity sensors as typically used in mobile phones emit a light signal and measure the back-reflected light intensity. Based on the measured back-reflected light intensity, the presence of an object is derived. Most of the proximity sensors include a single light source and a single photo detector in the same package. Such systems have been presented e.g. by Fadell et al. in US patent application US 2008/0006762 A1. Different ways to integrate an optical proximity sensor into a small module based on emitting light and measuring the back-reflected reflected light signal from an object have been presented by Campbell in U.S. Pat. No. 8,748,856 B2 and by Rudmann in U.S. Pat. No. 8,791,489B2.

Other approaches have been presented to increase the reliability of the intensity-measurement based proximity sensor by mainly suppressing internal reflections and stray light paths as much as possible. Such approaches have been published by Findlay in US patent application US 2012/0133956A1 and by Rossi in U.S. Pat. No. 8,674,305B2.

The key challenges of those system are first, to detect highly absorbing objects that reflect only little signal and second, to either suppress or compensate for stray light and reflections e.g. caused by dirt on the front cover of the proximity sensor or, if integrated in a mobile phone, dirt and/or dust on the mobile phone's front cover.

Recent trends to overcome stray light issues and to add more functionality into the proximity sensor module show that the latest proximity sensors tend to measure the proximity by actually measure the distance to the object in front of the proximity sensor module, also called depth sensing system. The terms depth and distance are interchangeable in all following context. A first proximity sensor based on a depth sensor module called time-of-flight depth sensor based on single photon avalanche diodes (SPAD) has been presented by Baxter in U.S. Pat. No. 8,610,043B2.

Next to SPAD-based proximity sensors, it is expected that so-called indirect time-of-flight depth measurement devices will be integrated in proximity sensors. A system based on indirect time-of-flight depth measurement approaches used as a proximity sensor has been presented in the US patent application US2014/0346361A1. Indirect time-of-flight measurement devices measure the phase shift of the emitted light compared to the reflected and captured light, which is delayed by the travel time of the light to the object and back. The actual depth is finally derived from the measured phase information. One of the key advantages of the indirect time-of-flight measurement compared to SPAD-based direct time-of-flight is that indirect (or phase-based) time-of-flight measurements systems have drastically reduced timing resolution requirements. Typically, such indirect time-of-flight sensors are based on demodulation pixels that are capable of sampling the impinging light at several points in time and based on those samplings, the phase, the amplitude and the offset information of the impinging light can be deduced.

Variants of pixels to perform the demodulation in indirect time-of-flight measurement systems are e.g. described in the following patents: U.S. Pat. No. 5,856,667, EP1009984B1, EP1513202B1 and U.S. Pat. No. 7,884,310B2. However, it is well-known that indirect time-of-flight sensors strongly suffer from, temporal drifts, mixed depth pixels, multiple reflections and stray light caused by dirt or dust particles. All these measurement distortions make indirect time-of-flight systems extremely challenging and expensive to be operated reliably.

Further, the future depth sensor module in the proximity sensor application not only measures the depth of a single point in space, but preferably supplies a two-dimensional depth map in a given field of view measured by an array of depth measuring pixels. The availability of a depth map supplied by the proximity sensor in a mobile phone, even if only 10×10 pixels or less, will enable the introduction of completely new functionalities such as gesture recognition for touch free operation of devices, e.g. as presented in US patent application US 2013/0179162A1.

It is an object of this invention, to provide a new type of depth sensor module and a corresponding new type of depth sensing method.

It is an object of this invention, to provide a highly robust depth sensor module and depth sensing method.

At least one of these objects can be achieved at least in part through features of the claims. Further advantageous embodiments follow from the dependent claims and the description.

The depth sensor module can include a light emitting part for illuminating objects and a light detector part, the light emitting part and the light detector part being spatially offset in the direction of a triangulation baseline. The light emitting part can include at least two light sources spatially offset in the direction of the triangulation baseline, wherein the light detector part is configured to acquire light and to provide along the direction of the triangulation baseline an intensity distribution of the acquired light. In case an object is illuminated by the two light sources of the illuminating part of the depth sensor module, the intensity distribution of the acquired light stems from two different light sources accordingly. Knowing the spatial offsets between the light sources and the light detector part enables a triangulation, which enables a depth estimation, namely an estimation of the distance between the depth sensor module and the object.

In some embodiments, the depth sensor module is configured to perform a triangulation evaluation using the intensity distribution of the acquired light. By measuring and evaluating the intensity distribution of the at least two light sources, one can triangulate along the direction of the triangulation baseline, and hence, measure distances. E.g., the depth sensor module can be operable to carry out triangulation calculations in dependence of the intensity distribution and, optionally, also in dependence of spatial offsets between the light sources and pixels of the light detecting part.

In some embodiments, the depth sensor module is configured to enable a triangulation evaluation by determining a zero-crossing point of the difference between two intensity distributions of acquired light originating from two of the at least two light sources of the light emitting part. The triangulation-based evaluation of the distance of the object based on the differential signals of the intensity distribution of acquired light originating from the at least two different light sources offset spatially in the direction of triangulation baseline enables to reduce typical prior art triangulation requirements of emitting well focussed light points or structures to guarantee for precise lateral resolution.

Applying a system of the described kind, the light emitter part can emit non-structured light such as diffuse light generated by each of the at least two light sources. The light can have rather wide cones of light (emission cones) instead of having to exhibit sharp points, lines or structures as it is typically requested by prior art triangulation systems.

Since the position of the intensity difference of the light emitted by the at least two light sources is well defined in the direction of the triangulation basis (and can be determined with high precision), the evaluation of the triangulation system based on the signal difference (which is well structured) becomes straight-forward, even when the cones of lights emitted are not well structured.

Further, the setup of the light emitting part is simplified, because in many cases light sources already emit cones of light and thus (more or less) unstructured light.

The requirements for projecting optics, if present, are drastically reduced. In instances, the depth sensor modules can be devoid any projecting optics.

Further, the evaluation of the differential signal along the direction of the triangulation baseline captured by the light detection part can result in an increased stability of the depth sensor measurements in terms of susceptibility to manufacturing tolerances, thermal drifts, aging artefacts and so on.

In some embodiments of the present invention, the at least two light sources are configured to be controlled individually. An individual control of the at least two light sources enables to alternate the light emission by the different light sources. E.g. if the light emitting part includes or even consists of a first and a second light sources, and both are individually controllable, the first light source can be turned on while the second light source is turned off. The back-reflected light is captured by the light detection part, and a first intensity distribution is measured. Thereafter, the first light source is turned off and the second light source is turned on. The back-reflected light is captured by the light detection part, and a second intensity distribution is measured. By subtracting the two intensity distribution measurements, a zero-crossing point along the direction of the triangulation baseline can be determined. Finally, the evaluation of the zero-crossing point directly refers (relates) to the depth of the object.

Further, the individual control of the at least two light sources enables to alternate the light emission of the at least two light sources during a single exposure. When combining an alternating control of the light sources with a light detection part that includes a sensor with demodulation pixels, the demodulation pixels can be synchronized with the alternating control of the at least two light sources. The demodulation pixels are capable to transfer photo-generated charges generated when the first light source is turned on into first storages of the pixels, to transfer photo-generated charges generated when a second light source is turned on into second storages and so on if further light sources and further storages are provided. This procedure can be repeated many times during a single exposure and the photo-generated charges can be integrated in the storages of the demodulation pixels before reading out the values and performing the evaluation.

Further, state-of-the-art demodulation pixels include a background light removal circuitry or a signal subtraction circuitry, which can further simplify evaluation and enhance the dynamic range.

In some embodiments, the at least two light sources are arranged on a single die. E.g., they can be included in a single die. The integration of the at least two light sources on a single die enables to reduce space and costs, both important criteria for high volume, low costs application of a proximity sensor.

Further, having the at least two light sources on a single die can reduce the likelihood of possible performance discrepancies between the at least two light sources.

In some embodiments, a first and a second of the at least two light sources are operable to emit a first light beam having a first light intensity distribution and a second light beam having a second light intensity distribution, respectively. Therein, the first and second light intensity distributions can be mutually symmetric with respect to a plane aligned perpendicularly to the triangulation baseline.

In some embodiments, the light emitting part is operable to alternatingly
illuminate objects with a first one of the at least two light sources while not illuminating the objects with a second one of the at least two light sources; and
illuminate objects with a second one of the at least two light sources while not illuminating the objects with a first one of the at least two light sources.

In some embodiments, the light detector part includes an image sensor configured to acquire light. The implementation of an image sensor in the light detector part enables the acquisition of a full two-dimensional image of intensity distributions. E.g. in case a first image is captured while a first light source is turned on and a second light source is turned off, and a second image is captured when a second light source is turned on and a first light source is turned off, the two intensity distribution images can be subtracted from each other. Possibly, a zero-crossing point can then be found on every pixel line of the image sensor in the direction of the triangulation baseline. Having e.g. an image sensor with a resolution of m×n pixels, where n is the number of pixels in along the direction of the triangulation baseline and m along the orthogonal direction (orthogonal to the triangulation baseline), m zero-crossing points representing distances to the object may be detected. In other words, a full depth line can be measured.

In some embodiments, the image sensor includes or even is a time-of-flight sensor. The time-of-flight sensor is capable of demodulating the incoming light. Synchronizing it with the at least two light sources enables to perform triangulation measurements as herein described. State-of-the-art time-of-flight pixels further enable to suppress background light. This means the pixels are capable of subtracting signals on the pixel and therefore increase the dynamic range of the system.

In some embodiments, the depth sensor module is configured to enable time-of-flight measurements. In case the image sensor includes or even consists of time-of-flight pixels, each of the time-of-flight pixels can be used to determine a depth using the described triangulation method, too. Having e.g. an image sensor with m×n time-of-flight pixels, where n is the number of pixels along the direction of the triangulation baseline and m along the orthogonal direction, m zero-crossing points representing distances to the object can be detected. Further, since each of the m×n time-of-flight pixels of the image sensor is capable of rendering a depth value, a full depth map can be generated. Based on the m depth values derived by the triangulation approach and the m×n depth values derived by the time-of-flight measurement, reliability of the depth measurements can be increased. E.g. since the described triangulation-based measurements suffer less from internal reflections and from stray light e.g. due to dirt and dust, the depth data derived by the triangulation method can be used to calibrate the time-of-flight depth map, while the time-of-flight depth map generates a full two-dimensional depth map.

In some embodiments, the light emitting part includes at least one optical feedback pixel. The at least one optical feedback pixel can be used to control the power of the at least two light sources. In case the pixel field of the image sensor consists of time-of-flight pixels, the at least one optical feedback pixel can be used to further calibrate the depth measurement accomplished using the time-of-flight pixels of the image sensor. In instances, the at least one optical feedback pixel is arranged on (e.g., included in) the same die as the pixel field.

Further, if there are several optical feedback pixels, the pixels can have different sensitivities to cover a bigger dynamic range. If there are several optical feedback pixels, the individual results of the optical feedback pixels can be averaged or combined to improve a signal-to-noise ratio of the optical feedback results.

Moreover, the depth sensor module can be configured as a proximity sensor.

The depth sensor module can be used as a (possibly simple) proximity sensor.

Besides a depth sensor module, also a depth sensing method is described. The method can have properties corresponding to properties of any of the described sensor modules. It can be, e.g., a depth sensing method using a depth sensor having a light detector part and a light emitting part, the light emitting part and the light detector part being spatially offset in the direction of a triangulation baseline. The light emitting part includes at least two light sources spatially offset in the direction of the triangulation baseline. The depth sensing method comprises the steps of: acquiring light using the light detector part, and providing in the direction of the triangulation baseline an intensity distribution of the acquired light. In a variant, a triangulation evaluation using the intensity distribution of the acquired light is performed. In a variant, a triangulation evaluation is performed by determining a zero-crossing point of the difference between two intensity distributions of acquired light originating from two of the at least two light sources of the light emitting part. In a variant, the at least two light sources of the light emitting part are controlled individually. In a variant, the light is acquired using an image sensor included in the detector part. In a variant, a time-of-flight measurement is performed. In a variant, an optical-feedback measurement is performed using at least one optical feedback pixel in the light emitting part. In a variant, the depth sensor module is used as a proximity sensor.

The herein described apparatuses and methods will be more fully understood from the detailed description given herein below and the accompanying drawings which should not be considered limiting to the invention described in the appended claims. The drawings:

FIG. 1a sketches a three dimensional view of a depth sensor module, e.g., designed as proximity sensor.

FIG. 1b shows a horizontal cross section of the depth sensor module of FIG. 1a.

FIG. 1c shows a vertical cross section of the depth sensor module of FIG. 1a.

Figure 2A:
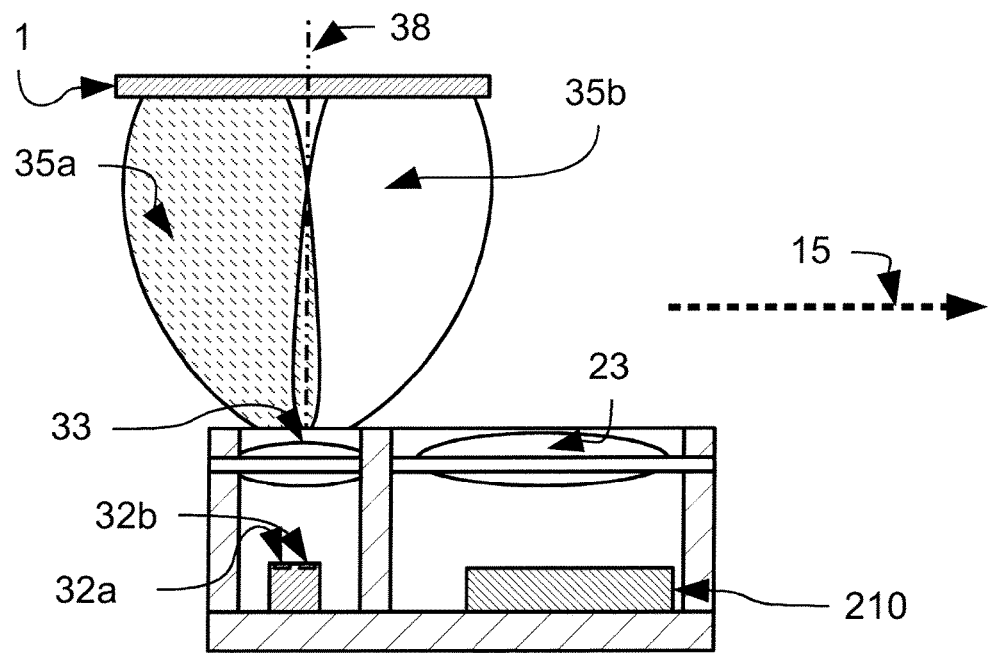
FIG. 2a illustrates illumination beams in the depth sensor module from FIG. 1, visualizing a first light beam and the second light beam.
Figure 2B:
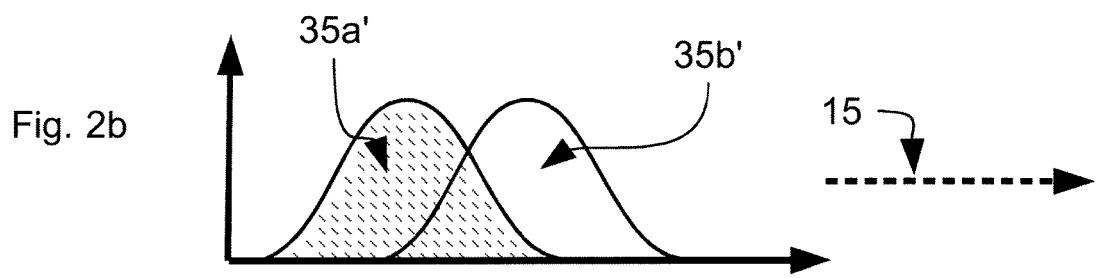

FIG. 2b plots a light power distribution of the first light beam and the second light beam along the direction of a triangulation baseline.

Figure 2C:
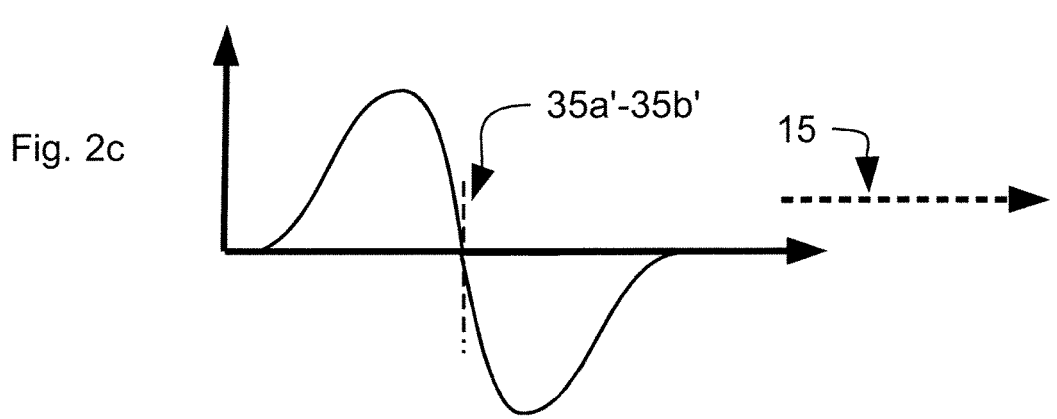

FIG. 2c shows the differential signal of the first and second light beams.

Figure 3A:
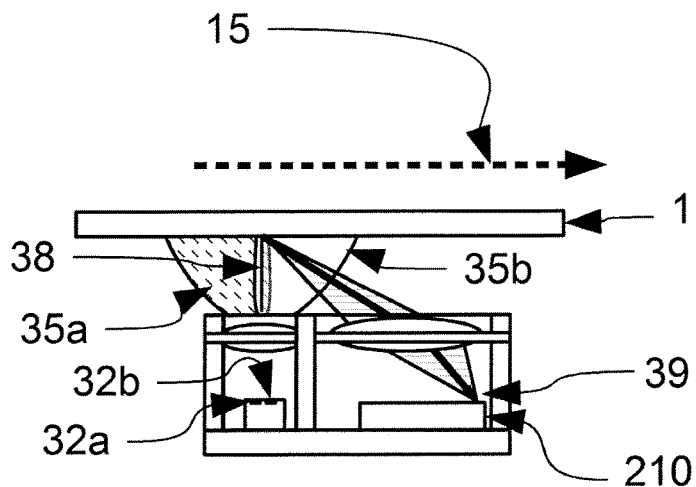
Figure 3B:
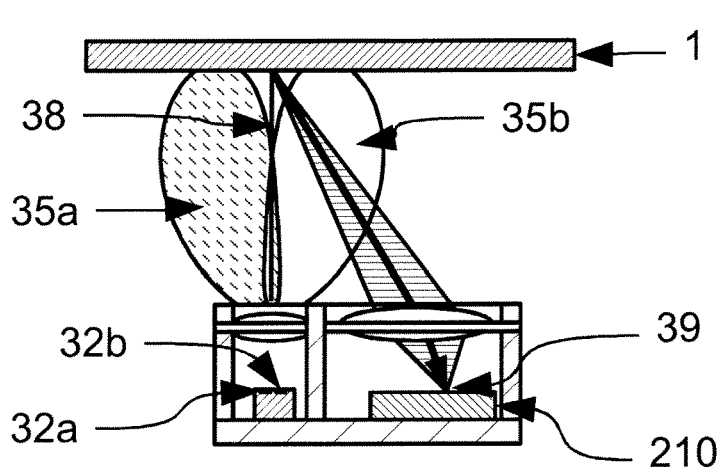
Figure 3C:
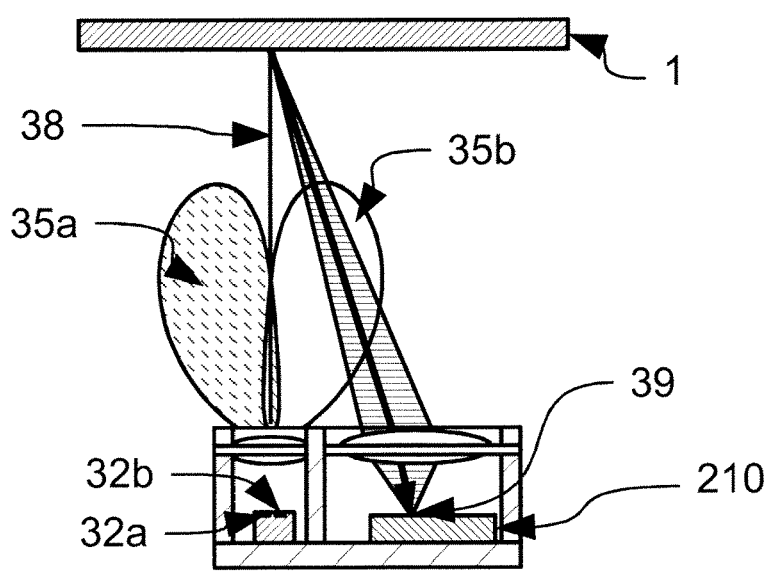

FIGS. 3a to c illustrate a zero-crossing triangulation-based approach with zero-crossing points on a pixel field moving as a function of a distance of an object to the depth sensor module.

Figure 4A:
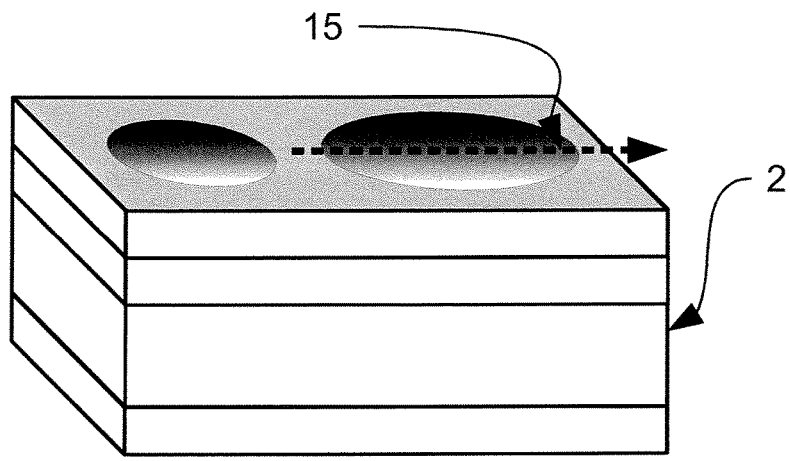
Figure 4B:
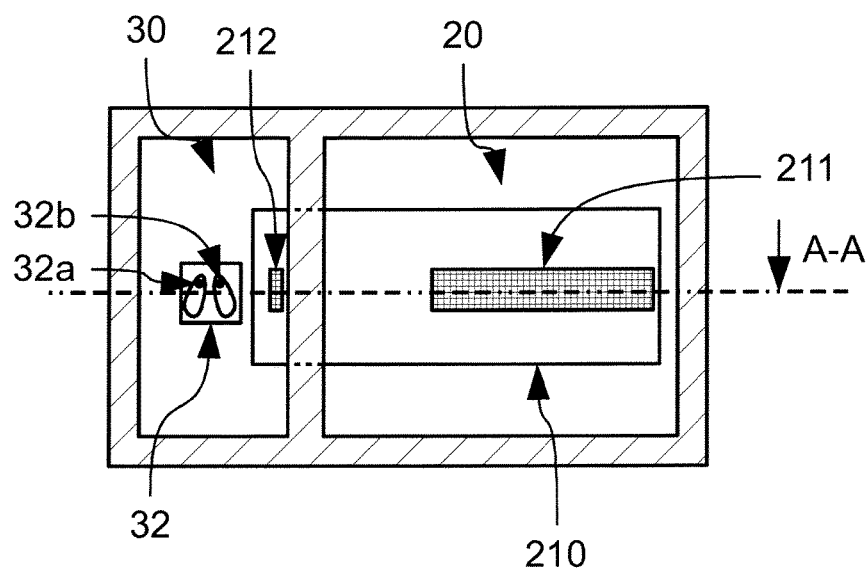
Figure 4C:
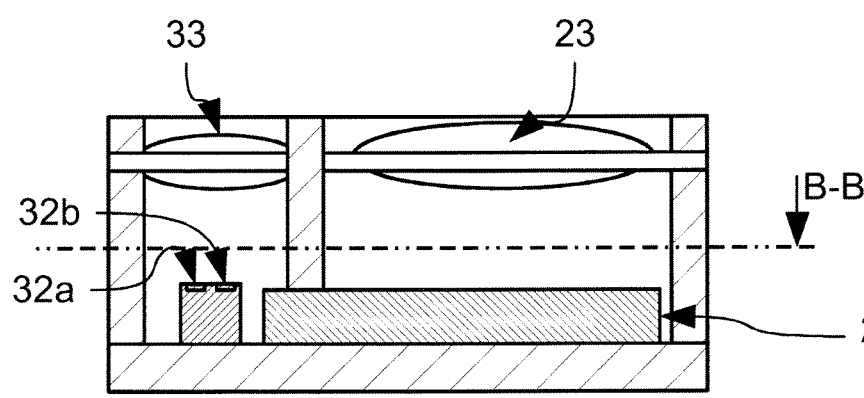

FIGS. 4a to c show a depth sensor module in a perspective view, in a vertical-cross-section, and in a horizontal cross-section, respectively, wherein the depth sensor module includes optical feedback pixels that can be used for calibration purposes.

Figure 5:
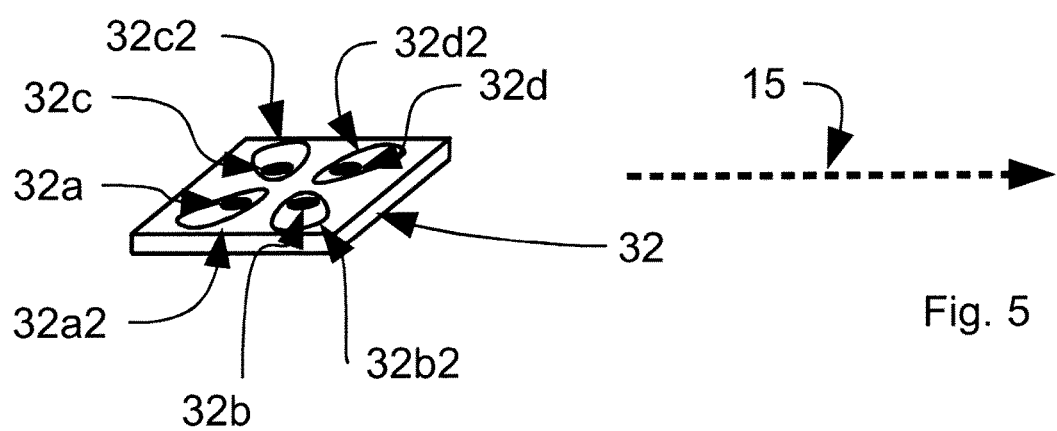

FIG. 5 shows in a perspective view a light emitting die with four separately controllable light sources on it.

Figure 6:
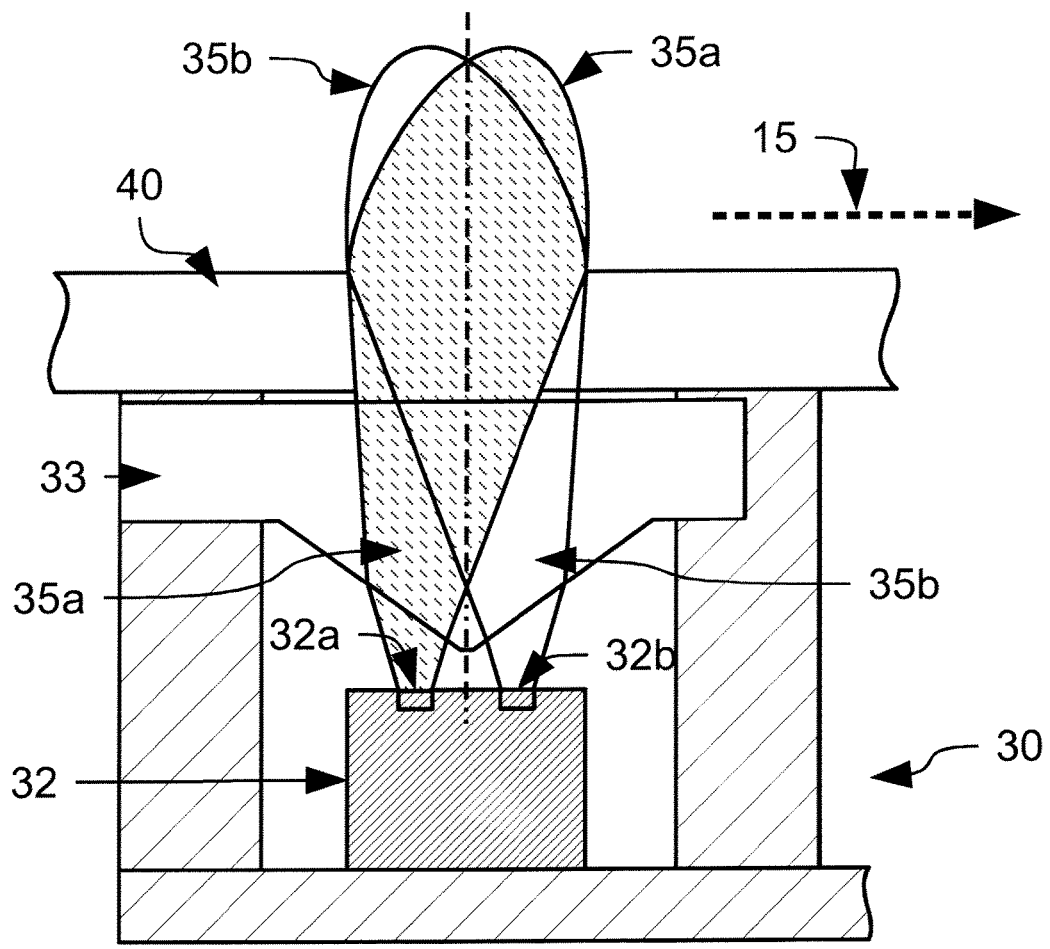

FIG. 6 shows the light emitting part of a depth sensor module, which includes a first light source and a second light source together with a projecting optics that optimizes the module to deal with stray light caused by dirt or dust particles on top of a cover/protection glass.

LIST OF REFERENCE SYMBOLS

1 Object
2 Depth sensor module
15 Direction of triangulation baseline
20 Light detection part
210 Image sensor
211 Pixel field
212 Optical feedback pixel(s)
23 Imaging optics
30 Light emitting part
32 Light emitting die
32a First light source
32b Second light source
32c Third light source
32d Fourth light source
32a2 Pad of the first light source
32b2 Pad of the second light source
32c2 Pad of the third light source
32d2 Pad of the fourth light source
33 Projecting optics
35a First light beam
35b Second light beam
38 Zero-crossing axis
39 Zero-crossing point
40 Cover glass Prior art proximity sensor modules include a light source and a photo detector. Light is emitted by the light source and detected by the photo detector. In case some light of the emitted light source is reflected back to the proximity sensor and detected by the photo detector, it is assumed that an object is in front of the proximity sensor. Typically simple signal thresholding is performed to decide whether there is an object in close range or not.

Recent developments towards the integration of actual depth sensors into proximity sensors promise more reliable proximity detections. However, those depth sensors strongly suffer from stray light caused by dirt and/or dust.

Triangulation is the process of determining the location (or distance) of a point in a scene. At either end of a baseline, the angles between the point and the baseline are measured or known, respectively. Using trigonometric formulas, the distance between the triangulation baseline and the point can be calculated.

FIGS. 1a-c show a depth sensor module 2. FIG. 1a sketches the depth sensor module in a 3-D view, while FIG. 1b shows a top view in the horizontal cross section, and FIG. 1c a side view in the vertical cross section. The depth sensor module 2 includes a light emitting part 30 and a light detection part 20. The light emitting part 30 and the light detection part 20 are spatially offset in the direction of the triangulation baseline 15. The light emitting part 30 includes at least two light sources 32a and 32b which are spatially offset along the direction of the triangulation baseline 15. The two light sources may be on the same light emitting die 32 as illustrated in the drawing. In some implementations, the two light sources 32a and 32b are, e.g., vertical cavity surface emitting laser diodes (VCSEL) on the same light emitting die 32. In this illustrated case, the light emitting die 32 includes two pads to individually control the two light sources 32a and 32b from the outside, corresponding to a possible embodiment.

It is also possible to simply have two separate light sources 32a and 32b in the light emitting part 30 that are not on the same die, e.g. two separate LEDs, VCSELs or laser diodes. However, the two light sources 32a and 32b are spatially offset along the direction of the triangulation baseline 15. The light generated by the first light source 32a and the second light source 32b is projected into the scene onto the object 1 (cf. FIG. 2a) by the projecting optics 33. In case part of the emitted light is reflected back by the object 1, the back-reflected light will be imaged by the imaging optics 23 onto a pixel field 211 of the image sensor 210. The image sensor 210 includes the pixel field 211, but further may also include one or more of driving, control and evaluation circuitries. However, any or all of those circuitries may also be placed outside the image sensor 210, e.g., in a separate chip.

FIG. 2a-c illustrate the depth sensor module 2 of FIG. 1, but with a first light beam 35a and a second light beam 35b are shown in the drawing of FIG. 2a for illustration purposes. The light power of the first light beam 35a can be the same as the light power of the second light beam 35b, and the two light beams can be symmetric along a zero-crossing axis 38 (or more precisely: zero-crossing surface/plane in a three-dimensional space). The object 1 is illuminated by the first light beam 35a and the second light beam 35b individually. The image sensor 210 is used to acquire the light reflected by the object 1 illuminated by the first light beam 35a and the second light beam 35b. The intensity distribution of the light acquired by the image sensor 210 along the direction of the triangulation baseline 15 is plotted in the drawing of FIG. 2b, namely the intensity distribution 35a' of the acquired light during illumination by the first light beam 35a and the intensity distribution 35b' of the acquired light during illumination by the second light beam 35b. The differential signal 35a'-35b', namely the intensity distribution 35b' of the acquired light during illumination by the second light beam 35b subtracted from the intensity distribution 35a' of the acquired light during illumination by the first light beam 35a, is plotted in FIG. 2c.

In order to obtain the differential signal 35a'-35b', the first light source 32a and the second light source 32b may be switched on and off in alternating series.

In FIG. 2a, while the first light source 32a together with the projecting optics 33 generates a first light beam 35a, the second light source 32b in combination with the projecting optics 33 generates a second light beam 35b, which is offset or tilted along direction of the triangulation baseline 15 with respect to the first light beam 35a. For example, the two light sources 32a and 32b are simply offset on the same light emitting die 32 and the projecting optics 33 in front of the two light sources 32a and 32b further modifies the shape of the two light beams 35a and 35b in order to enhance the detectability of the zero-crossing point.

The zero-crossing axis 38 represents the positions where the power of the first light beam 35a is equivalent to the power of the second light beam 35b. The projecting optics 33 may consist of several optical elements such as lenses and/or diffractive optical elements, or may be built by a single lens element or may even consist of a simple glass.

By imaging the back-reflection from the object 1 of each of the two emitted light beams 35a and 35b through the imaging optics 23 onto the pixel field 211 of the image sensor 210 and subtracting the signals generated while the second light source 32b is on from the signals captured when the first light source 32a is on, the resulting differential signal 35a'-35b' will show the zero-crossing point 39 (cf. FIGS. 3a-c) along the direction of the triangulation baseline 15 where the intensity of the reflected light from the object 1 back to the light detector part 20 during illumination by the first light beam 35a is equal to the intensity of the reflected light from the object 1 back to the light detector part 20 during illumination by the second light beam 35b. The zero-crossing point 39 on the pixel field 211 on the image sensor 210 can be used to triangulate, which means, the location of the zero-crossing point 39 relates to and allows to determine the distance of the object 1 to the depth sensor module 2. The drawing in FIG. 2b shows the intensity distribution of the acquired light during illumination by the first light beam 35a and the intensity distribution of the acquired light during illumination by the second light beam 35b along the direction of the triangulation baseline 15. FIG. 2c illustrates the difference of the signal generated by the back-reflection of the first light beam 35a and the back-reflection of the second light beam 35b.

Varying the power ratio of the two light sources 32a and 32b enables to tilt the zero-crossing axis 38 back and forth along the direction of the triangulation baseline 15. This may give certain flexibility in steering the zero-crossing axis.

Compared to actual time-of-flight depth sensing technologies, the proposed zero-crossing triangulation method is significantly more stable with respect to stray light originating, e.g., from reflections from dirt or dust particles appearing in front of the depth sensor module 2. In case the pixel field 211 on the image sensor 210 includes or even consists of time-of-flight pixels, the signals of the time-of-flight image sensor can be used to first detect and localize the zero-crossing point, and, thus to reliably measure a first distance. Subsequently, the stable zero-crossing triangulation-based distance measurement can be used to calibrate the depth map generated by the time-of-flight measurements of each of the pixels of the time-of-flight image sensor. The zero-crossing triangulation-based calibration of the time-of-flight depth map can be done on-the-fly as long as the zero-crossing point 39 is imaged at least partly from the object 1 onto the pixel field 211 by the imaging optics 23. In case object 1 is not always imaged onto the pixel field 211 by the imaging optics 23, the calibration can at least be updated whenever the zero-crossing point becomes visible on the pixel field 211. The detection of the position of the zero-crossing point 39 enables to correct for all stray light issues on the time-of-flight depth measurements. In case that the pixel field 211 includes or even consists of demodulation pixels such as used in indirect time-of-flight sensors, each of the pixels typically includes or even consists of two storage nodes. Such demodulation pixel architectures have been presented in U.S. Pat. No. 5,856,667, EP1009984B1, EP1513202B1 and U.S. Pat. No. 7,884,310B2.

Therefore, the photo-generated charges when the first light source 32a is turned on can be stored on the first storage nodes of the pixels, and the photo-generated charges when the second light source 32b is turned on can be stored in the second storage nodes of the pixels. The first and second light sources 32a, 32b can be alternately turned on and off during an exposure, while synchronizing them with the switches in the demodulation pixels steering the photo-generated charges to either the first storage nodes of the pixels or the second storage nodes of the pixels, respectively.

Further, having a background removal circuitry on the demodulation pixels enables to get rid of all the charges generated by background light. Such background removal circuitries for demodulation pixels have been presented in PCT publication WO2009135952A2 and in the U.S. Pat. No. 7,574,190B2 and U.S. Pat. No. 7,897,928B2. The removal of a common mode signal level on the different storage nodes of each pixel can drastically increase the dynamic range of the depth sensor module 2.

FIGS. 3a to c illustrate an exemplary embodiment of the zero-crossing triangulation approach. In all drawings of FIGS. 3a-c, a first light source 32a emits a first light beam 35a, and a second light source 32b emits a second light beam 35b. Both light beams are typically transformed by projecting optics 33. But in instances, projection optics can also be dispensed with. The back-reflected light beams from object 1 are imaged by the (generally optional) imaging optics 23 (cf. FIG. 2a) onto the pixel field 211 of the image sensor 210. In order to measure the zero-crossing point, the first and second light sources are alternately turned on and off.

At a short distance of the object 1 to the depth sensor module 2, as illustrated in FIG. 3a, the zero-crossing point 39 in the differential image, where the intensity of the back-reflected and detected light during illumination by the first light beam 35a and the intensity of the back-reflected and detected light during illumination by the second light beam 35b are the same, is imaged by the imaging optics 23 to a position close to the right edge of the pixel field 211 on the image sensor 210.

At a medium distance of the object 1 to the depth sensor module 2, as illustrated in FIG. 3b, the zero-crossing point 39 of the differential image moves to the left on the pixel field 211 of the image sensor 210, while at an even longer distance of the object 1 to the depth sensor module 2, as illustrated in FIG. 3c, the zero-crossing point 39 of the differential image even further moves to the left on the pixel field 211 of the image sensor 210.

The zero-crossing point 39 in the difference of the images captured when the first light source 32a is turned on and when the second light source 32b is turned on can be used for triangulation purposes. The image difference can be generated e.g. by sequentially capturing two images, namely one image with the first light source 32a turned on and one with the second light source 32b turned on, and subtract one from the other.

Another possibility is to integrate so-called demodulation pixels as light sensing pixels in the pixel field 211. Such demodulation pixels have been presented in U.S. Pat. No. 5,856,667, EP1009984B1, EP1513202B1 and U.S. Pat. No. 7,884,310B2. Demodulation pixels can have two storage sites on each pixel. The steering of the photo-generated charges from the photo-sensitive area to one of the two charge storages can be done in synchronization with the alternate control of the first light source 32a and the second light source 32b. The result will be that the first storage nodes of each pixel of the pixel field 211 store the photo-generated charges generated while the first light source 32a is turned on, and the second storage nodes of each pixel of the pixel field 211 store photo-generated charges while the second light source 32b is turned on. More sophisticated demodulation pixels already include subtracting circuitry in each pixel. This enables a better background light signal removal and therefore a more robust system. In case the pixels in the pixel field 211 of the image sensor 210 are time-of-flight pixels, the raw sampling data—possibly in combination with the on-pixel background removal circuitry of the time-of-flight pixels—can be used to find the zero-crossing point 39 and determine depths, based on the localization of the zero-crossing point on the pixel field 211. The travel times of the emitted light from the depth sensor module 2 to the object 1 and back measured by the time-of-flight pixels in the pixel field 211 on the image sensor 210 can further enable to build a full two-dimensional depth map. The depth measurements derived by the zero-crossing triangulation approach can be used to calibrate the two-dimensional depth map derived from the time-of-flight based depth measurements. The calibration performed using the zero-crossing triangulation approach improves the stability and robustness of the depth sensor module in terms of stray light, thermal drifts and many others artefacts. Time-of-flight pixels integrated in the image sensor 210 may be demodulation pixels as used in indirect (phase measurement based) time-of-flight measurement systems or direct (single photon avalanche detection-based) time-of-flight measurement systems. Depending on the need and application, the calibration evaluation based on the triangulation approach can be carried out with every single depth measurement, or may be done from time to time, or can be done simply whenever required.

The different illustrations in FIGS. 4a-c show another embodiment. FIG. 4a is a three dimensional drawing of the depth sensor module 2. FIG. 4b shows the horizontal cross-section B-B, FIG. 4c the vertical cross-section A-A. The depth measurement principle of the depth sensor module 2 is the same as the one sketched in FIG. 1a to c. However, this embodiment further includes optical feedback pixels 212 in the light emitting part 30. For example, there is not only one optical feedback pixel but several, even a full array of optical feedback pixels, in order to increase signal-to-noise ratio of the measured feedback. The different optical feedback pixels also may have different sensitivities or different exposure times to increase the dynamic range of the optical feedback operation. The optical feedback pixels can be used to measure and then control the emitted light power of the first light source 32a and the second light source 32b. Furthermore, if the optical feedback pixels 212 are time-of-flight pixels, the optical feedback pixels can also be used to calibrate for the time-of-flight measurements. The optical feedback pixels can be on the same integrated image sensor 210 than the pixel field 211, but they can also be on two separate chips.

The optical feedback pixels can e.g. be used as feedback pixels to adjust emitted light intensities, calibrate for intensities, adjust phase delay, calibrate for phase delays, or detect dirt/dust. Fast intensity variations may be caused by temperature changes or can mean deposition/removal of dirt/dust, while slow intensity variations may be consequences of aging.

FIG. 5 shows a sketch of a light emitting die 32, which includes four different light sources 32a, 32b, 32c, and 32d. Each of the four light sources 32a to 32d can be controlled individually. In the given illustration, each of the four light sources 32a, 32b, 32c, and 32d has its own contact pad 32a2, 32b2, 32c2, and 32d2, respectively, and therefore full driving control from the outside of the light emitting die 32 is possible. The availability of more than two light sources in the light emitting part 30 as sketched in FIG. 5 enables to apply more sophisticated calibration schemes and renders the system more stable in terms of stray light e.g. caused by dirt or dust particles, deflecting parts of the emitted light beams directly back into the light detector part 20.

FIG. 6 shows only the light emitting part 30 of an embodiment of the depth sensor module 2, with a cover glass 40 in front of the depth sensor module 2. The two light sources 32*a* and 32*b* are spatially offset in the triangulation direction 15. The light emitted by the two light sources 32*a* and 32*b* is transformed by the projecting optics 33 as such that the light distribution of the first light beam 32*a* and the second light beam 32*b* are as equal as possible at the area, where typically dirt or dust may reflect stray light into the light detector part 20. By having a similar distribution of the first light beam 35*a* and the second light beam 35*b* at the area from where stray light comes from, typically from the front surface of a cover glass 40, the back-scattered stray light originating from the first light beam 35*a* and the back-scatted stray light originating from the second light beam 35*b* will be the same or at least very similar. However, from that position onward, the two light beams can slightly drift apart in order to produce a clean depth dependant zero-crossing on the pixel field 211 on the image sensor 210.

The following embodiments are furthermore disclosed:

Depth Sensor Module Embodiments:

E1. A depth sensor module (2) including a light emitting part (30) for illuminating objects and a light detector part (20), the light emitting part (30) and the light detector part (20) being spatially offset in the direction of a triangulation baseline (15), characterized in that the light emitting part (30) includes at least two light sources (32*a*, 32*b*) spatially offset in the direction of the triangulation baseline (15), wherein the light detector part (20) is configured to acquire light and to provide in the direction of the triangulation baseline (15) an intensity distribution of the acquired light.

E2. The depth sensor module (2) according to embodiment E1, characterized in that the depth sensor module (2) is configured to perform a triangulation evaluation using the intensity distribution of the acquired light.

E3. The depth sensor module (2) according to embodiment E1 or E2, characterized in that the depth sensor module (2) is configured to enable a triangulation evaluation by determining a zero-crossing point of the difference between two intensity distributions of acquired light originating from two of the at least two light sources (32*a*, 32*b*) of the light emitting part (30).

E4. The depth sensor module (2) according to one of embodiments E1 to E3, characterized in that the at least two light sources (32*a*, 32*b*) are configured to be controlled individually.

E5. The depth sensor module (2) according to one of embodiments E1 to E4, characterized in that the at least two light sources (32*a*, 32*b*) are arranged on a single die (32).

E6. The depth sensor module (2) according to one of embodiments E1 to E5, characterized in that the light detector part (20) includes an image sensor (210) configured to acquire light.

E7. The depth sensor module (2) according to embodiment E6, characterized in that the image sensor (210) is a time-of-flight image sensor.

E8. The depth sensor module (2) according to one of embodiments E1 to E7, characterized in that the depth sensor module (2) is configured to enable a time-of-flight measurement.

E9. The depth sensor module (2) according to one of embodiments E1 to E8, characterized in that the light emitting part (30) includes at least one optical feedback pixel (212).

E10. The depth sensor module (2) according to one of embodiments E1 to E9, characterized in that the depth sensor module (2) is configured as a proximity sensor.

Depth Sensing Method Embodiments:

E11. A depth sensing method using a depth sensor module (2) having a light emitting part (30) for illuminating objects and a light detector part (20), the light emitting part (30) and the light detector part (20) being spatially offset in the direction of a triangulation baseline (15), characterized in that the light emitting part (30) includes at least two light sources (32*a*, 32*b*) spatially offset in the direction of the triangulation baseline (15), wherein the depth sensing method comprises the steps of: emitting light using the light emitting part (30), acquiring light using the light detector part (20), and providing in the direction of the triangulation baseline (15) an intensity distribution of the acquired light.

E12. The depth sensing method according to embodiment E11, characterized in that a triangulation evaluation using the intensity distribution of the acquired light is performed.

E13. The depth sensing method according to embodiment E11 or E12, characterized in that a triangulation evaluation is performed by determining a zero-crossing point (39) of the difference between two intensity distributions of acquired light originating from two of the at least two light sources (32*a*, 32*b*) of the light emitting part (30).

E14. The depth sensing method according to one of embodiments E11 to E13, characterized in that the at least two light sources (32*a*, 32*b*) are controlled individually.

E15. The depth sensing method according to one of embodiments E11 to E14, characterized in that the light is acquired using an image sensor (210) included in the detector part (20).

E16. The depth sensing method according to one of embodiments E11 to E15, characterized in that a time-of-flight measurement is performed.

E17. The depth sensing method according to one of embodiments E11 to E16, characterized in that an optical-feedback measurement is performed using at least one optical feedback pixel (212) in the light emitting part (30).

E18. The depth sensing method according to one of embodiments E11 to E17, characterized in that the depth sensor module (2) is used as a proximity sensor.

The invention claimed is:

1. A depth sensor module comprising:
   a light emitting part for illuminating objects and a light detector part, the light emitting part and the light detector part being spatially offset in the direction of a triangulation baseline, wherein the light emitting part comprises at least two light sources spatially offset in the direction of the triangulation baseline, wherein the light detector part is configured to acquire light and to provide along the direction of the triangulation baseline an intensity distribution of the acquired light,
   the module further including control and evaluation circuitry operable to enable a triangulation evaluation by determining a zero-crossing point of a difference between two intensity distributions of acquired light originating from two of the at least two light sources of the light emitting part and operable to perform the triangulation evaluation based on the determined zero-crossing point.

2. The depth sensor module according to claim 1, wherein the at least two light sources are configured to be controlled individually.

3. The depth sensor module according to claim 1, wherein the at least two light sources are comprised in a single die.

4. The depth sensor module according to claim 1, wherein a first and a second of the at least two light sources are operable to emit a first light beam having a first light intensity distribution and a second light beam having a second light intensity distribution, respectively, wherein the first and second light intensity distributions are mutually symmetric with respect to a plane aligned perpendicularly to the triangulation baseline.

5. The depth sensor module according to claim 1, wherein the light emitting part is operable to alternatingly
illuminate objects with a first one of the at least two light sources while not illuminating the objects with a second one of the at least two light sources; and
illuminate objects with a second one of the at least two light sources while not illuminating the objects with a first one of the at least two light sources.

6. The depth sensor module according to claim 1, wherein the light detector part includes an image sensor configured to acquire light.

7. The depth sensor module according to claim 6, wherein the image sensor comprises a time-of-flight image sensor.

8. The depth sensor module according to claim 1, wherein the depth sensor module is configured to enable time-of-flight measurements.

9. The depth sensor module according to claim 1, wherein the light emitting part includes at least one optical feedback pixel.

10. The depth sensor module according to claim 1, wherein the depth sensor module is a proximity sensor.

11. A depth sensing method using a depth sensor module having a light emitting part for illuminating objects and a light detector part, the light emitting part and the light detector part being spatially offset in the direction of a triangulation baseline, wherein the light emitting part includes at least two light sources spatially offset in the direction of the triangulation baseline, wherein the method comprises:
emitting light using the light emitting part,
acquiring light using the light detector part, and
obtaining an intensity distribution of the acquired light along the direction of the triangulation baseline,
performing a triangulation evaluation using the intensity distribution of the acquired light, wherein performing the triangulation evaluation comprises determining a zero-crossing point of a difference between a first and a second intensity distributions of acquired light originating from a first and a second of the at least two light sources of the light emitting part, respectively.

12. The depth sensing method according to claim 11, wherein a first and a second of the at least two light sources are operated to emit a first light beam having a first light intensity distribution and a second light beam having a second light intensity distribution, respectively, wherein the first and second light intensity distributions are mutually symmetric with respect to a plane aligned perpendicularly to the triangulation baseline.

13. The depth sensing method according to claim 11 comprising alternatingly
illuminating objects with a first one of the at least two light sources while not illuminating the objects with a second one of the at least two light sources; and
illuminating objects with a second one of the at least two light sources while not illuminating the objects with a first one of the at least two light sources.

14. The depth sensing method according to claim 11, comprising controlling the at least two light sources individually.

15. The depth sensing method according to claim 11, wherein the light detector part comprises an image sensor, and wherein light is acquired using the image sensor.

16. The depth sensing method according to claim 11, comprising performing a time-of-flight measurement.

17. The depth sensing method according to claim 11, wherein the light emitting part comprises at least one optical feedback pixel, and wherein the method comprises performing an optical-feedback measurement using the at least one optical feedback pixel.

18. The depth sensing method according to claim 11, wherein the depth sensor module is a proximity sensor, and wherein the method comprises carrying out proximity measurements.

* * * * *